US010613662B2

(12) United States Patent
Westhues

(10) Patent No.: US 10,613,662 B2
(45) Date of Patent: Apr. 7, 2020

(54) COMMON-MODE AND DIFFERENTIAL SIGNALS FOR TOUCH DISPLAY

(71) Applicant: Microsoft Technology Licensing, LLC, Redmond, WA (US)

(72) Inventor: Jonathan Westhues, Sunnyvale, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 56 days.

(21) Appl. No.: 15/869,646

(22) Filed: Jan. 12, 2018

(65) Prior Publication Data

US 2019/0064975 A1 Feb. 28, 2019

Related U.S. Application Data

(60) Provisional application No. 62/550,479, filed on Aug. 25, 2017.

(51) Int. Cl.
*G06F 3/041* (2006.01)
*G06F 3/044* (2006.01)
*G06F 3/0354* (2013.01)
*G06F 3/0488* (2013.01)
*G06F 3/046* (2006.01)

(52) U.S. Cl.
CPC ........ *G06F 3/0412* (2013.01); *G06F 3/03545* (2013.01); *G06F 3/044* (2013.01); *G06F 3/046* (2013.01); *G06F 3/0418* (2013.01); *G06F 3/04883* (2013.01); *G06F 2203/04112* (2013.01)

(58) Field of Classification Search
CPC .. G06F 3/0418; G06F 3/0412; G06F 3/03545; G06F 3/044; G06F 2203/04112
See application file for complete search history.

(56) References Cited

U.S. PATENT DOCUMENTS

| 9,285,913 B1* | 3/2016 | Kang .................... G06F 3/0412 |
| 2011/0025635 A1 | 2/2011 | Lee |
| 2012/0068961 A1* | 3/2012 | Mizuhashi ............ G06F 3/0412 345/174 |

(Continued)

OTHER PUBLICATIONS

"International Search Report and Written Opinion Issued in PCT Application No. PCT/US2018/038664", dated Aug. 28, 2018, 13 Pages.

*Primary Examiner* — Christopher E Leiby
(74) *Attorney, Agent, or Firm* — Alleman Hall Creasman & Tuttle LLP

(57) ABSTRACT

A touch-sensitive in-cell display device includes an active matrix of row conductors and column conductors, a plurality of pixels, and a controller. Each pixel is connected to a row conductor and a column conductor at a different intersection of the active matrix and each pixel is connected to a common electrode. The controller is configured to perform a display-write operation on a pixel at a first time at least by applying different voltages to the row conductor, the column conductor, and the common electrode connected to the first pixel, and perform an electrostatic measurement at a second time at least by applying a same common-mode excitation voltage to the row conductor, the column conductor, and the common electrode connected to the pixel, while measuring a current through a designated conductor.

18 Claims, 8 Drawing Sheets

(56) References Cited

U.S. PATENT DOCUMENTS

| | | | |
|---|---|---|---|
| 2012/0154322 A1* | 6/2012 | Yang | G06F 3/0412 345/174 |
| 2012/0162133 A1* | 6/2012 | Chen | G06F 3/0412 345/174 |
| 2013/0314343 A1* | 11/2013 | Cho | G06F 3/0412 345/173 |
| 2013/0342478 A1* | 12/2013 | Bae | G06F 3/041 345/173 |
| 2015/0097802 A1* | 4/2015 | Kim | G06F 3/044 345/174 |
| 2015/0109227 A1* | 4/2015 | Shin | G06F 3/044 345/173 |
| 2015/0212644 A1* | 7/2015 | Noto | G06F 3/0416 345/174 |
| 2016/0147350 A1* | 5/2016 | Kida | G06F 3/044 345/174 |
| 2016/0266709 A1* | 9/2016 | Kurasawa | G06F 3/0416 |
| 2016/0378239 A1 | 12/2016 | Lee et al. | |
| 2017/0090644 A1* | 3/2017 | Yao | G06F 3/0416 |
| 2017/0192573 A1 | 7/2017 | Kim et al. | |
| 2018/0260077 A1* | 9/2018 | Westhues | G06F 3/0418 |
| 2018/0329536 A1* | 11/2018 | Tanaka | G06F 3/0412 |

* cited by examiner

COMMON-MODE AND DIFFERENTIAL SIGNALS FOR TOUCH DISPLAY

CROSS REFERENCE TO RELATED APPLICATIONS

This application claims priority to U.S. Provisional Patent Application Ser. No. 62/550,479, filed Aug. 25, 2017, the entirety of which is hereby incorporated herein by reference for all purposes.

BACKGROUND

A wide variety of computing devices employ capacitance-based sensors together with display panels. This enhances the computing experience by enabling a user to interact with the computing device via touch inputs. Such devices can take on form factors varying from pocket-sized personal devices (e.g., smartphones) to large-format devices supported on stands or mounted to walls. Touch interaction is provided by sensing of the user's body (e.g., fingers/hands) near or in contact with the display and, in some cases, additionally through use of a passive or active stylus.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A touch-sensitive in-cell display device includes an active matrix of row conductors and column conductors, a plurality of pixels, and a controller. Each pixel is connected to a row conductor and a column conductor at a different intersection of the active matrix and each pixel is connected to a common electrode. The controller is configured to perform a display-write operation on a pixel at a first time at least by applying different voltages to the row conductor, the column conductor, and the common electrode connected to the first pixel, and perform an electrostatic measurement at a second time at least by applying a same common-mode excitation voltage to the row conductor, the column conductor, and the common electrode connected to the pixel, while measuring a current through a designated conductor.

DETAILED DESCRIPTION

Figure 1:
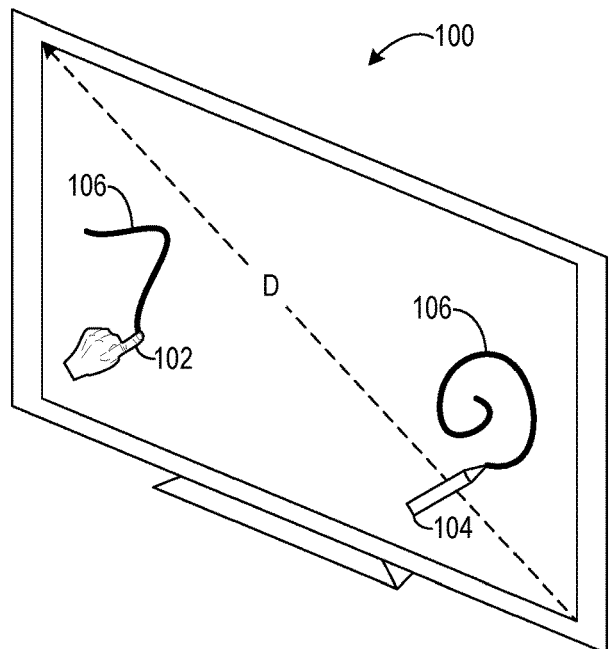
FIG. 1 shows an example touch-sensitive display device receiving touch inputs from a finger and an active stylus.

Touch interactivity in touch-sensitive devices may be implemented by using electrodes to provide driving signals and interpret capacitances from nearby input that influence these signals. Such interpretation may be characterized as an electrostatic measurement of a capacitance. Electrostatic measurements may be made for various purposes. Electrostatic measurement may be made, for example, to learn things about objects near or in contact with a touch-sensitive display device. Learned information may include: (1) position of the object; (2) proximity of the object (i.e., "hovering" distance) away from the surface of the display; (3) size of the object, as inferred from its detected contact patch on the display device; (4) shape of the object, again inferred from the contact patch; (5) electrical properties of the object, such as capacitance or the degree to which the object is electrically grounded; (6) identity of the object, e.g., to discern one user from another; and (7) velocity of the object, to name but a few examples.

Electrostatic measurements can be susceptible to noise. Among other sources, display activity can be a significant contributor to such noise. Therefore, in some capacitive-based touch-sensitive display devices, time division may be employed to (a) perform electrostatic measurements and (b) write images to the display, such that the two operations do not happen simultaneously. For example, 16.7 milliseconds of a 60 Hz touch-sensing frame may be divided roughly in half, allocating roughly 8 milliseconds to display write operations and 8 milliseconds to electrostatic measurements. This time-multiplexing means, for example, that although the display device may be capable of writing at 120 Hz, the display will only write at 60 Hz, because only half the time is available for display-write operations. The time available to measure capacitances for touch input similarly may be cut in half. This may manifest as increased spatial noise on the reported position.

Accordingly, the present description is directed to an approach for controlling an in-cell touch-sensitive display device to enable display-write operations and electrostatic measurements to be performed simultaneously in at least some operating conditions. The in-cell touch-sensitive display device may include an active matrix of row conductors and column conductors, and a plurality of pixels. Each pixel may be connected to a row conductor and a column conductor at a different intersection of the active matrix and each pixel may be connected to a common electrode.

To activate a particular pixel, a voltage differential must be created across the intersection of the pixel. As such, a display-write operation may be performed at least by applying different voltages to electrical connections of a pixel (e.g., the row conductor, the column conductor, and the common electrode connected to the different pixel).

Furthermore, to enable the control approach described herein, while the display-write operation is being performed on the pixel, an electrostatic measurement (e.g., to detect touch input) may be performed on a different pixel at the same time at least by applying a same common-mode excitation voltage to electrical connections of the different pixel (e.g., a row conductor, a column conductor, and a common electrode connected to the pixel), while measuring a current through a designated conductor (e.g., the common electrode). The common-mode excitation voltage may be positive, negative, or even zero in some scenarios (e.g., while measuring an active pen capacitance in which a voltage is applied to the pen tip electrode instead of the digitizer electrode). Since the electrostatic measurement excitation voltage is common-mode across all the electrical connections of the different pixel, the excitation voltage does not affect other pixels of the active matrix. Accordingly, the display-write operations and the electrostatic measurements can be performed at the same time with no change in function of the touch-sensitive display device. By performing display-write operations and electrostatic measurements at the same time, a display frame rate and a touch-sensing frame rate of the in-cell touch-sensitive display device can be increased, and system latency can be decreased.

FIG. 1 shows a touch-sensitive display device 100 that may be configured in the manner described above. Touch-sensitive display device 100 may be implemented in a variety of forms. For example, display device 100 may be implemented as a so-called "large-format" display device with a diagonal dimension of approximately 1 meter or greater, or in a mobile device (e.g., tablet, smartphone) with a diagonal dimension on the order of inches. Other suitable forms are contemplated, including but not limited to desktop display monitors, high-definition television screens, tablet devices, laptop computers, etc.

Touch-sensitive display device 100 may be configured to sense one or more sources of input, such as touch input imparted via a finger 102 and/or stylus 104. The stylus 104 may be passive or active. The finger 102 and the stylus 104 are provided as non-limiting examples. Touch-sensitive display device 100 may be configured to receive input from styluses and fingers in contact with the display surface and/or "hovering" over the display surface. "Touch input" as used herein refers to both finger and non-finger (e.g., stylus) input, and to input supplied by input devices both in contact with, and spaced away from but proximate to, touch-sensitive display device 100. In some examples, touch-sensitive display device 100 may be configured to receive input from two or more sources simultaneously, in which case the display may be referred to as a multi-touch display. Touch-sensitive display device 100 may include an image source configured to generate graphical output 106 based on display signals provided to the touch-sensitive display device 100.

Figure 2:
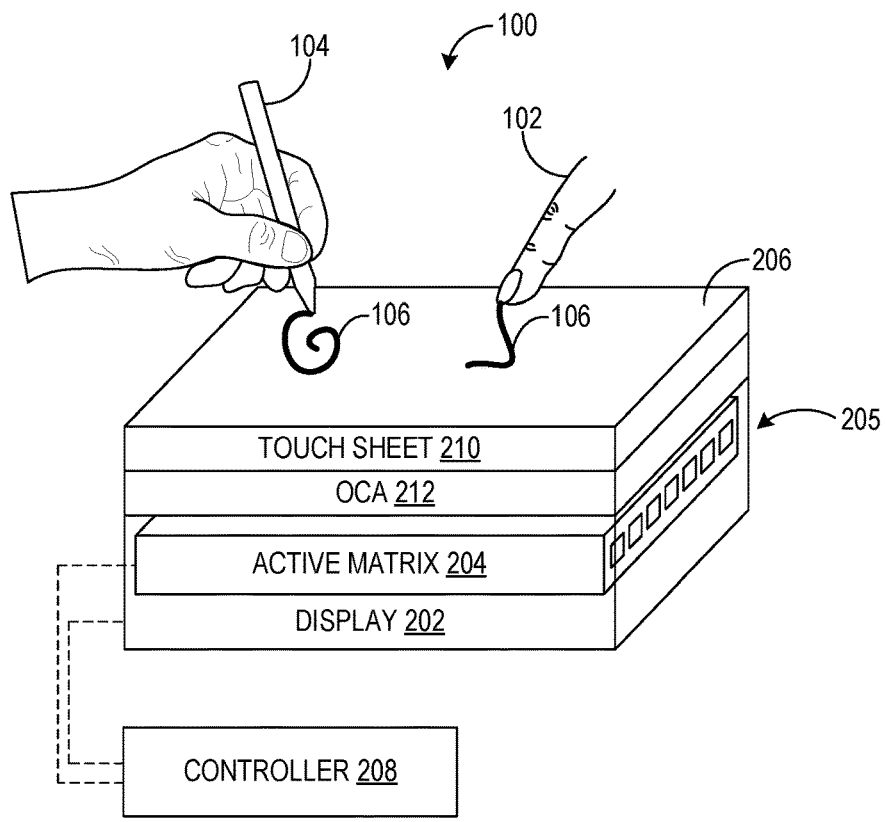
FIG. 2 shows an example touch-sensitive in-cell display device.

FIG. 2 schematically shows a block representation of touch-sensitive display device 100. The touch-sensitive display device 100 includes a display 202 including an active matrix 204 of pixels 205. Display 202 is configured as a so-called "in-cell" touch sensor implementation in which one or more components of display 202 may be operated to perform both display output and input sensing functions. As a particular example, components of pixels 205 (e.g., activating electrodes) may be used both for capacitive touch sensing and image forming. When one or more of the pixel activating electrodes of active matrix 204 define a specific XY touch location on the display device, those activating electrodes may be referred to as a "sensel." Because each sensel is connected to a pixel 205 of active matrix 204, electrostatic measurements for capacitive touch sensing may be referred to as being performed on the pixel, in some cases.

Display 202 is operable to emit light through display device 100, such that perceptible images can be formed at a surface 206 of the display device. For example, display 202 may assume the form of a liquid crystal display (LCD), or any other suitable display. To effect display operation, FIG. 2 shows display 202 operatively coupled to a controller 208, which may control pixel operation, refresh rate, drive and/or receive electronics, operation of a backlight, and/or other aspects of the display. A suitable image source, which may be integrated with, or provided separately from, controller 208, may provide graphical content for output by display 202. The image source may be a computing device external to, or integrated within, display device 100, for example. In one example, the image source is a graphics processing unit (GPU) that outputs image frames to controller 208. In the depicted implementation, the controller 208 is configured to control operation of the display 202 to provide both display output and input sensing functions. However, in other implementations, separate display and touch sensor controllers may be provided.

When active matrix 204 is being controlled to function as a touch sensor, active matrix 204 is operable to receive touch input, which may assume various suitable form(s). As examples, active matrix 204 may detect (1) touch input applied by the finger 102 in contact with display surface 206 of display device 100; (2) a force and/or pressure applied by the finger 102 to the display surface 206; (3) hover input applied by the finger 102 proximate to but not in contact with display surface 206; (4) a height of the hovering finger 102 from the display surface 206, such that a substantially continuous range of heights from the display surface 206 can be determined; and/or (5) input from a non-finger touch source, such as an active stylus 104. In some examples, active matrix 204 may receive position, tip force, button state, and/or other information from stylus 212, and in some examples, may transmit information to the stylus. Active matrix 204 may be operable to receive input from multiple input sources (e.g., digits, styluses, other input devices) simultaneously, in which case display device 100 may be referred to as a "multi-touch" display device. To enable input reception, active matrix 204 may be configured to detect changes associated with the capacitance of the plurality of pixels 205, as described in further detail below.

Touch inputs (and/or other information) received by active matrix 204 are operable to affect any suitable aspect of display 202 and/or a computing device operatively coupled to display device 100, and may include two or three-dimensional finger inputs and/or gestures. As an example, FIG. 2 depicts the output of graphical content 106 by display 202 in spatial correspondence with paths traced out by the finger 102 and the stylus 104 proximate to display surface 206.

Display device 100 may include other components in addition to display 202. As an example, FIG. 2 shows the inclusion of an optically clear touch sheet 210. Touch sheet 210 may be comprised of any suitable materials, such as glass or plastic. Further, an optically clear adhesive (OCA) 212 bonds the touch sheet 210 to the display 202. As used herein, "optically clear adhesive" refers to a class of adhesives that transmit substantially all (e.g., about 99%) of incident visible light. Display device 100 may include additional and/or alternative components.

Figure 3:
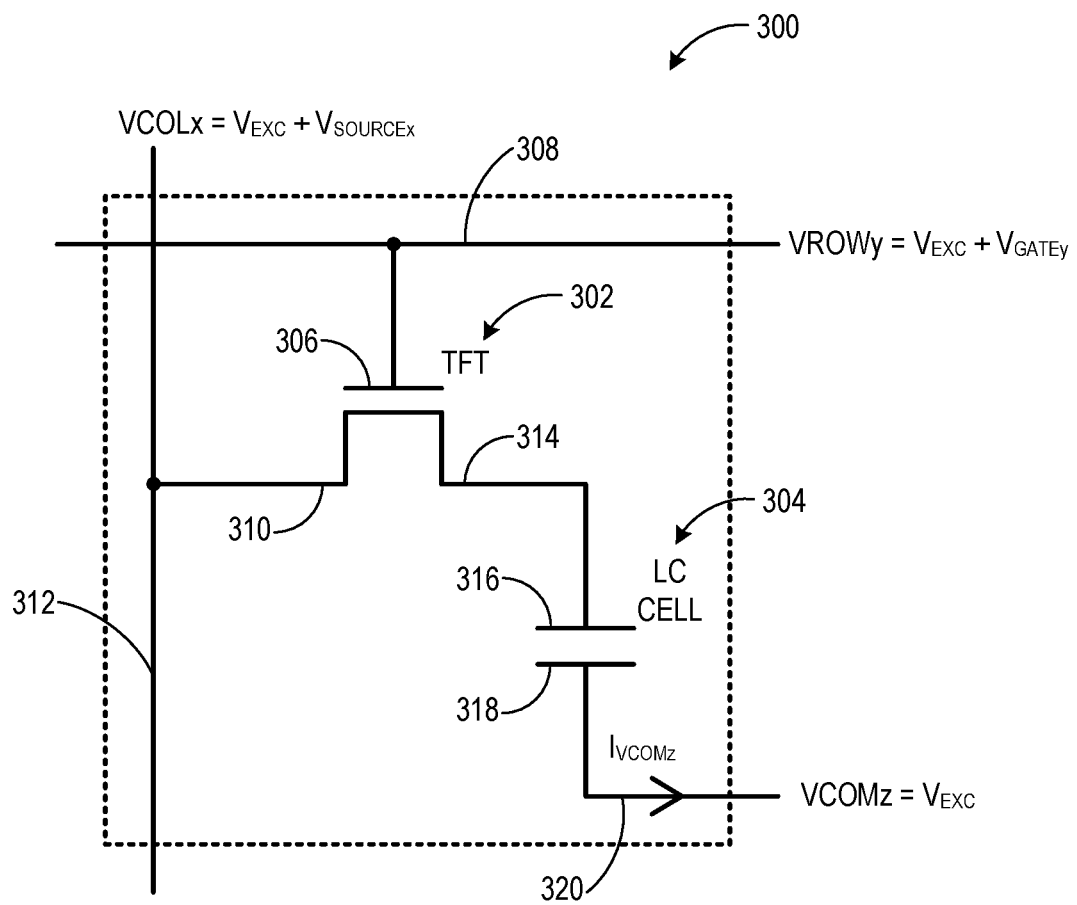
FIG. 3 shows an example touch and display circuit of an in-cell display device.

FIG. 3 shows an example touch and display circuit 300 that may be representative of a pixel in an active matrix, such as active matrix 204 of display device 100 of FIGS. 1 and 2. Any suitable number of circuits 300 representing pixels may be included in an active matrix of a touch-sensitive display device.

Circuit 300 includes a thin film transistor (TFT) 302 and a liquid crystal (LC) cell 304 that is electrically connected with the TFT 302. At each intersection of the active matrix, TFT's gate 306 is connected to a row conductor 308, and TFT's source 310 is connected to a column conductor 312. TFT's drain 314 is connected to a first electrode 316 of LC cell 304, and the other electrode 318 of LC cell 304 is connected to a common electrode 320. Common electrode 320 may be electrically connected to all pixels in the active matrix. Common electrode 320 is an example of a designated conductor through which a current may be measured to perform an electrostatic measurement to detect passive touch input or input from an active stylus.

To perform a display-write operation to LC cell 304, controller 208 of FIG. 2 (and/or corresponding drive electronics) may be configured to apply a column voltage (VCOL$_X$) to column conductor 312. Column voltage (VCOL$_X$) includes a common-mode voltage component (V$_{EXC}$) and a source voltage component (VSOURCE$_X$). Controller 208 may be configured to select the particular pixel/circuit 300 by applying a different row voltage (VROW$_Y$) on the corresponding row conductor 308. Row voltage (VROW$_Y$) includes the same common-mode voltage component (V$_{EXC}$) and a gate voltage component (VGATE$_Y$). The difference between the gate voltage component (VGATE$_Y$) and the source voltage component (VSOURCE$_X$)—i.e., the voltage differential between gate 306 and source 310—may cause TFT 302 to close, and electrically connect the column voltage (VCOL$_X$) to LC cell 304. When TFT 302 is opened, the LC cell's capacitance may hold that voltage approximately constant, for a period determined by leakage currents within the LC cell.

Note, in many implementations, the number of display pixels in an active matrix may differ from the number of touch-sensing sensels. In some in-cell configurations, common electrode 320 may be segmented into squares (e.g., approximately 5 mm by 5 mm) across the active matrix. These segments, referred to as sensels, may be used for capacitive sensing of passive touch and active stylus input. Each sensel may be connected to a pixel of the active matrix and terminated individually to electronics that drive the active matrix. For example, a sensel may be connected to or incorporated into common electrode 320 that is connected to LC cell 304 of circuit 300.

To closely control the displayed image, drive electronics may be configured to closely control the voltage across the LC cell 304. As such, in some implementations, the voltage on the LC cell's common electrode 320 may be shorted a power supply rail of the active matrix instead of being connected to a circuit for measuring capacitance, since that circuit may add noise, or present a higher impedance. Additionally or alternatively, the capacitance measuring circuits could be designed to maintain a sufficiently stable input voltage to display an acceptable image, but this would increase the cost of such capacitance measuring circuits.

To perform an electrostatic measurement on a sensel connected to or incorporated into common electrode 320 of circuit 300, controller 208 of FIG. 2 (and/or corresponding drive electronics) may be configured to apply a common-mode excitation voltage (V$_{EXC}$) on all signals to the circuit 300 including row conductor 308, column conductor 312, and common electrode 320, while measuring a current through a designated conductor (e.g., common electrode 320). The common-mode excitation voltage may be positive, negative, or even zero in some scenarios (e.g., while measuring an active pen capacitance in which a voltage is applied to the pen tip electrode instead of the digitizer electrode). In particular, the current measured out of each segment of common electrode 320—i.e. sensel, is proportional to the capacitance under test plus undesired interference terms that can be mitigated by controller 208 and/or associated electronics. The voltages applied to the different electrical connections of circuit 300 are given with respect to circuit ground, which may be roughly equal to the voltage of a user's body. This allows for an electrostatic measurement to be performed on the common electrode without activating the corresponding pixel. Because each sensel is connected to a pixel of active matrix 204, electrostatic measurements may be referred to as being performed on a pixel of the active matrix, in some cases. In some implementations, an electrostatic measurement may be performed by measuring a current through a conductor of the active matrix different than the common electrode.

According to such in-cell configurations, when all pixels are shorted to the same voltage, the display may perform identically to a conventional non-touch/stylus display, as if the sensels were one uniformly conductive sheet. To localize a finger or stylus, controller 208 may be configured to measure capacitance from each individual sensel to ground or to a stylus electrode. By applying a capacitance measurement excitation voltage common-mode on all signals to the active matrix, including the rows, columns, and common electrode segments while measuring a current on the common electrode, disruption to the displayed image may be avoided. This is because TFT switches 302 of each circuit 300 respond only to a differential voltage from gate 306 to source 310. Accordingly, display-write operations and the electrostatic measurements can be performed at the same time. By performing display-write operations and electrostatic measurements at the same time, a display frame rate and a touch-sensing frame rate of the in-cell touch-sensitive display device can be increased, and system latency can be decreased.

Furthermore, low-pass filter effects of trace resistance and stray capacitance in the active matrix may be reduced by applying the common-mode excitation voltage to all signals, since the alternating current (AC) voltage between any two conductors in the active matrix is zero in this case. The AC excitation voltage may be non-zero to localize a finger, and may be zero or non-zero to localize an active stylus, if the active stylus itself applies an excitation voltage.

In some implementations, an in-cell touch sensitive display device may be configured to perform multiplexing to some degree in order to share a single capacitance measuring circuit across multiple sensels. For example, a capacitance measuring circuit may be shared across multiple sensels in order to reduce a total number of measuring circuits implemented in a touch-sensitive display device, and thus reduce the overall cost of the touch-sensitive display device. In such configurations, a full area of the display is not scanned for stylus and touch input simultaneously.

Figure 4:
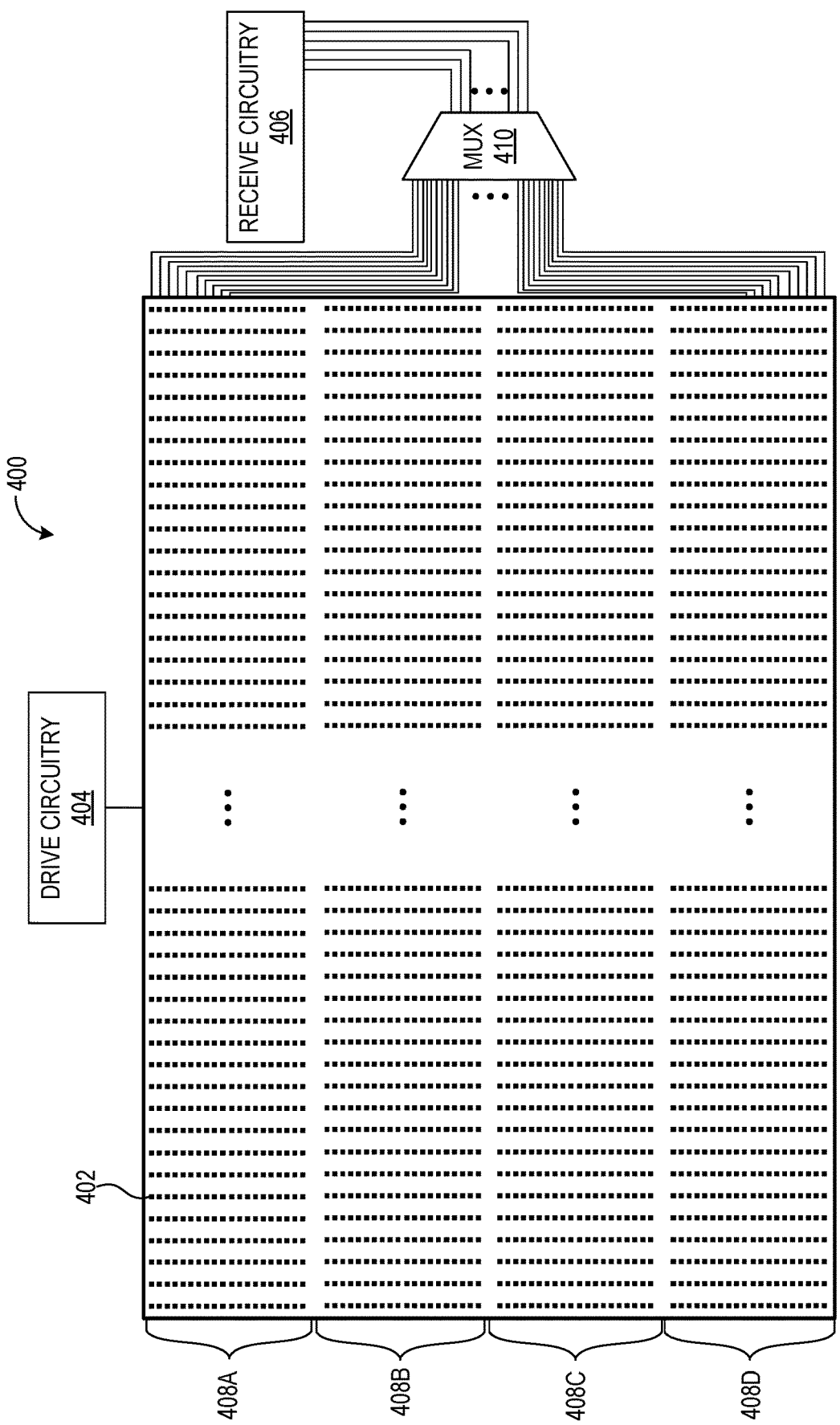
FIG. 4 shows an example in-cell touch-sensing active matrix.

FIG. 4 shows an example touch sensor 400 configured to perform multiplexing. Touch sensor 400 includes a plurality of electrodes, such as electrode 402, one or more of which are selectively driven to receive input in one or more of the forms described above—e.g., touch, hover, force/pressure, stylus/active input device. FIG. 4 is described in the context of an in-cell implementation, in which touch sensor 400 is configured as an in-cell sensor in combination with a display as described above. As such, touch sensor 400 may be implemented in active matrix 204 of FIG. 2 with capacitance-measuring electrodes 402 operating to control display operations of pixels 205 and resolve XY locations on the touch sensor.

To enable sensel charging for touch-sensing functionality, the sensels are operatively coupled to drive circuitry 404. Via drive circuitry 404, each sensel is selectively driven with one or more drive signals. To enable sensing of touch input, the sensels are operatively coupled to receive circuitry 406.

In some implementations, controller 208 of FIG. 2 may include drive circuitry 404 and receive circuitry 406.

Various capacitance measurements that enable sensing of touch input may be performed using drive circuitry 404 and receive circuitry 406. Such capacitance measurements may be performed in a touch-sensing frame. In particular, capacitance measurements may involve driving sensels with excitation voltages via drive circuitry 404, and monitoring how touch input influences the excitation voltages via receive circuitry 406 to perform input sensing.

Receive circuitry 406 may perform self-capacitance measurements in which the driving and receiving is performed by the same electrode. Receive circuitry 406 may perform correlation operations on output received from the sensels. In one example, output from a given sensel may be used in a correlation operation after charging of the sensel for an integer number of iterations in an integration period. In general, this involves determining one or more reference signals that are associated with an event to be identified (e.g., a touch occurring in the presence of a particular type of noise). Then, at run time, when a signal is received, the received signal is correlated against the pre-determined reference signal to determine the degree to which the received signal corresponds to what would be expected if a touch were present. In the event of high correlation, the receiving system registers that a touch has in fact occurred. Alternatively or additionally, the sensel may be continuously monitored during charging. In either case, self-capacitance of the plurality of sensels is measured for input sensing.

A limited number of sensels are shown in FIG. 4 for simplicity/clarity. In practice, touch sensor 400 may include 20,000 or more sensels when implemented in a large-format display device. In general, touch sensor 400 may include any suitable number of sensels. In one example, touch sensor 400 includes 20,000 sensels arranged in 100 rows and 200 columns. While it may be desirable to maximize sensing frequency by simultaneously measuring capacitance at each sensel, this would entail provision of significant processing and hardware resources. In particular, 20,000 receivers (e.g., analog-to-digital converters) in receive circuitry 406 would be needed to perform full-granularity, simultaneous self-capacitance measurements at each sensel. As such, partial-granularity, multiplexed approaches to self-capacitance measurement may be desired to reduce the volume of receive circuitry 406.

FIG. 4 illustrates one example approach to partial-granularity self-capacitance measurement in touch sensor 400, in which the sensels are grouped into horizontal bands 408A–408D, each having twenty rows of sensels. In this approach, self-capacitance measurements are temporally multiplexed via a multiplexer 410 such that a respective measurement time slot is provided for each band 408 within a touch-sensing frame. Accordingly, receive circuitry 406 may include a number of receivers equal to the number of sensels in a given band 408—e.g., 5,000 receivers. However, any suitable number and geometric grouping of sensels may be used in a multiplexing scheme to reduce the volume of receive circuitry. Further, similar grouping may be performed to reduce the volume of drive circuitry 406, alternatively or in addition to the use of partial-granularity receive circuitry.

In some implementations, the touch-sensitive display may be configured to spatially sequence display-write operations and electrostatic measurements so that a common-electrode segment is never used for display-write operations while a capacitance is being measured at the common-electrode segment. Similarly, at any given time, a pixel on which a display-write operation is performed may be spaced apart in an active matrix from a different pixel on which an electrostatic measurement is performed. This permits the common-electrode segment to be shorted with low impedance to a desired voltage while avoiding display artifacts.

Display-write operation may affect electrostatic measurements, since the display device measures only the current out of the common-electrode segments, and not the matrix row or column conductor currents. For example, the row conductor that drives the TFT gates may couple current into the common electrode through stray capacitances, and LC cells themselves couple current into the common electrode when a row of the display is written. Such interference may be avoided by sequencing capacitive measurements to avoid simultaneous display-write operations and electrostatic measurements in the same horizontal region of the active matrix.

Figure 5:
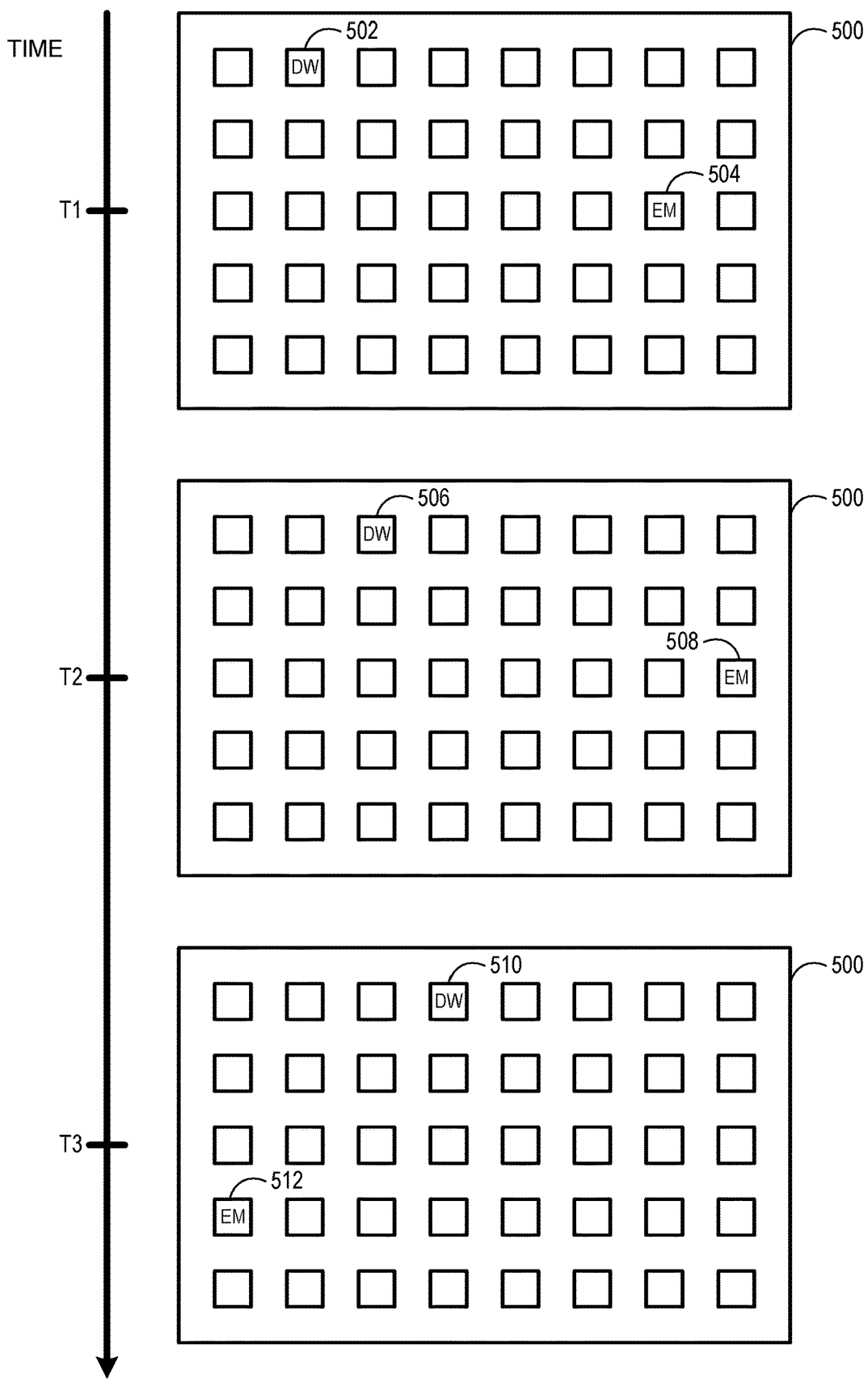
FIGS. 5 and 6 show example scenarios where display-write and capacitance measurements are performed simultaneously on an in-cell touch sensitive display.
Figure 6:
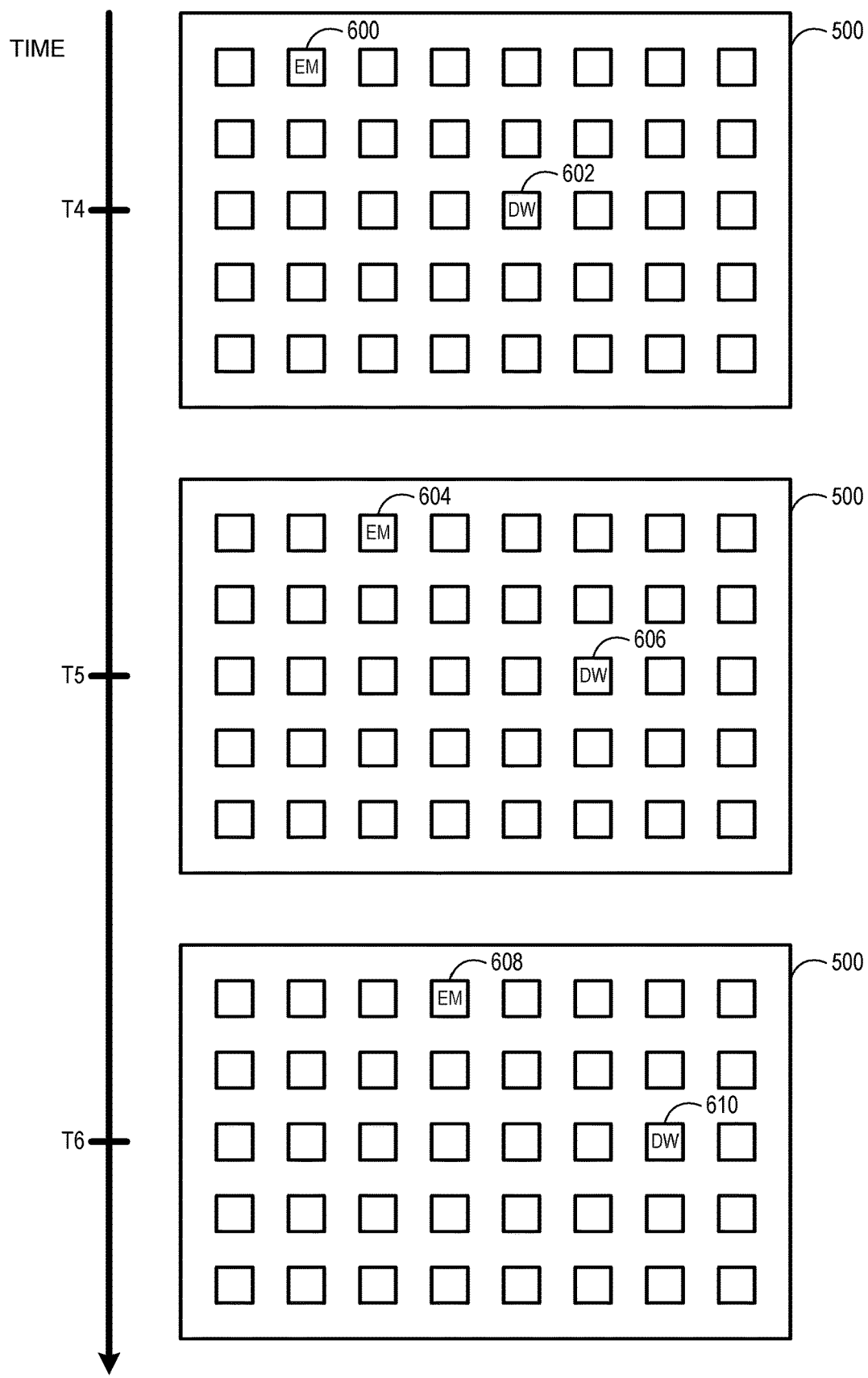

FIGS. 5 and 6 show example scenarios where display-write and capacitance measurements are performed simultaneously on different pixels spaced apart in an active matrix 500 of an in-cell, touch-sensitive display. Active matrix 500 is shown in simplified form with a limited number of pixels 502. In practice, an active matrix may include many more pixels. In the illustrated scenarios, display-write operations and electrostatic measurements are performed sequentially row-by-row moving from top to bottom of active matrix 500 and left to right in each row of active matrix 500. As shown in FIG. 5, at time T1, a first display-write operation 502 is performed on a second pixel in a first row of active matrix 500. While the first display-write operation 502 is being performed, at time T1, a first electrostatic measurement 504 is simultaneously performed on a seventh pixel in the third row of active matrix 500.

At time T2, operations are performed on the next pixels in the sequence. In particular, a second display-write operation 506 is performed on a third pixel in the first row of active matrix 500. While the second display-write operation 506 is being performed, at time T2, a second electrostatic measurement 508 is simultaneously performed on an eighth pixel in the third row of active matrix 500.

At time T3, operations are performed on the next pixels in the sequence. In particular, a third display-write operation 510 is performed on a fourth pixel in the first row of active matrix 500. While the third display-write operation 510 is being performed, at time T3, a third electrostatic measurement 512 is simultaneously performed on a first pixel in the fourth row of active matrix 500. Since the previous operation was performed on the last pixel in the seventh row, the sequence wraps around to the first pixel of the next row.

Moving to FIG. 6, subsequent display-write operations and electrostatic measurements are performed on pixels of active matrix 500. At time T4, a fourth electrostatic measurement 600 is performed on the second pixel of the first row of active matrix 500. While the fourth electrostatic measurement is being performed, at time T4, a fourth display-write operation 602 is simultaneously performed on a fifth pixel in the third row of active matrix 500.

At time T5, a fifth electrostatic measurement 604 is performed on the third pixel of the first row of active matrix 500. While the fifth electrostatic measurement is being performed, at time T5, a fifth display-write operation 606 is simultaneously performed on a sixth pixel in the third row of active matrix 500.

At time T6, a sixth electrostatic measurement 608 is performed on the fourth pixel of the first row of active matrix 500. While the sixth electrostatic measurement is being performed, at time T6, a sixth display-write operation 610 is simultaneously performed on a seventh pixel in the third row of active matrix 500.

In the illustrated sequence, the pixels on which the display-write operations are performed maintain a spacing of at least one row of active matrix 500 apart from pixels on which electrostatic measurements are performed so that the different operations do not interfere with each other. Any suitable spacing may be maintained between different pixels on which display-write operations and electrostatic measurements are performed. In another example, the pixels may be spaced apart from each other by approximately half the active matrix such that when one pixel is in the first row of the active matrix the other pixel is located in a row approximately halfway down the active matrix. In implementations where multiplexing is performed, pixels may be spaced apart from each other within a particular band of the active matrix.

In some cases, an entire frame may not be able to be sequenced such that there is no overlap between display write and capacitance measurements for touch sensing at a common-electrode segment. For example, this is the case when scheduling measurements whose location on the display is not fixed in each frame, but instead varies within the frame based on the position of a stylus or finger. In such cases, at least some known/unchanging portions of the frame may be scheduled to avoid overlap of display write and capacitance measurements being performed at a common-electrode segment in order to achieve at least a partial benefit.

A similar interference issue may occur due to stray capacitances on column conductors that drive the TFT sources. Accordingly, in some implementations, the in-cell LCD panel may be designed to minimize stray capacitance from column electrodes to the common electrode segments, and a display write line frequency and capacitance measurement frequency may be configured such that the interference is rejected by the capacitance measurement circuit's correlation.

Furthermore, in some implementations, controller 208 may be configured to model an effect that a display-write operation has on a common electrode (e.g., stray capacitance), and compensate for the modeled effect in an electrostatic measurement that is performed at the same time as the display-write operation. In one example, controller 208 uses the model to predict and subtract the effect of the display-write operations, as a function of the column voltage. That column voltage may be determined by the displayed image (e.g., pixel brightness), and the correction may therefore be continuously calculated as a function of the incoming video.

In some cases, when a pixel drive voltage having the same polarity (e.g., DC signal) is applied to pixels 205 of active matrix 204 for an extended duration, an image may be unintentionally retained or "burned in" to the display. Accordingly, in some implementations, controller 208 may be configured to employ a polarity inversion scheme to control active matrix 204 in order to prevent image retention by the display. Typically, controller 208 may be configured to perform a plurality of display-write operations in a touch sensing frame. According to the polarity inversion scheme, controller 208 may be configured to apply positive polarity voltages to a first subset of pixels and negative polarity voltages to a second subset of pixels during a particular touch-sensing frame. Controller 208 may alternate the polarity of the voltage applied to the different subsets of pixels from frame to frame.

Figure 7:
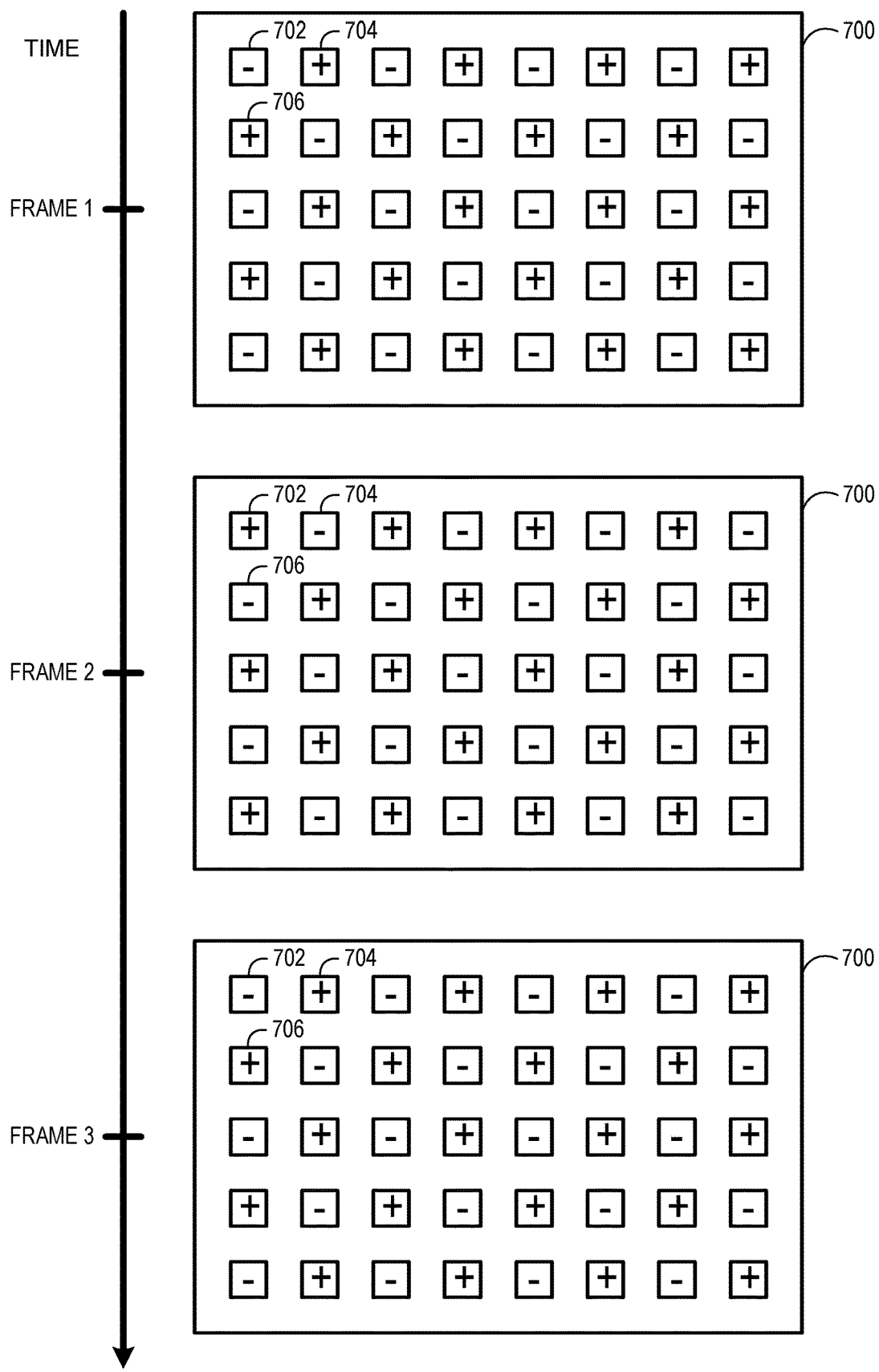
FIG. 7 shows an example scenario where a common-mode excitation voltage is applied with different polarities to electrodes of different pixels in a touch-sensing frame.

FIG. 7 shows an example scenario in which a polarity inversion scheme is employed to control an active matrix 700. In a first frame (FRAME 1), a first pixel 702, located in a first row and a first column of active matrix 700, is driven with a negative polarity voltage; and a second pixel 704, located in the first row and a second column of active matrix 700, is driven with a positive polarity voltage. This polarity inversion scheme continues alternating between pixels for the entire row. Furthermore, in the first frame, a third pixel 706, located in a second row and the first column of active matrix 700, is driven with positive polarity voltage. This polarity inversion scheme continues alternating between pixels for the entire column. In other words, this polarity inversion scheme spatially alternates, from row to row of pixels in a same column of the active matrix, between applying positive polarity voltages and applying negative polarity voltages. Such an inversion scheme results in a "checkerboard" layout.

In a second frame (FRAME 2), the polarity of the entire checkboard layout is inverted. As such, first pixel 702 is driven with a positive polarity voltage, second pixel 704 is driven with a negative polarity voltage, and third pixel 706 is driven with a negative polarity voltage. In a third frame (FRAME 3), the polarity of the entire checkboard layout is once again inverted. In other words, this polarity inversion scheme temporally alternates, from frame to frame, for each pixel, between applying positive polarity voltages and negative polarity voltages.

Figure 8:
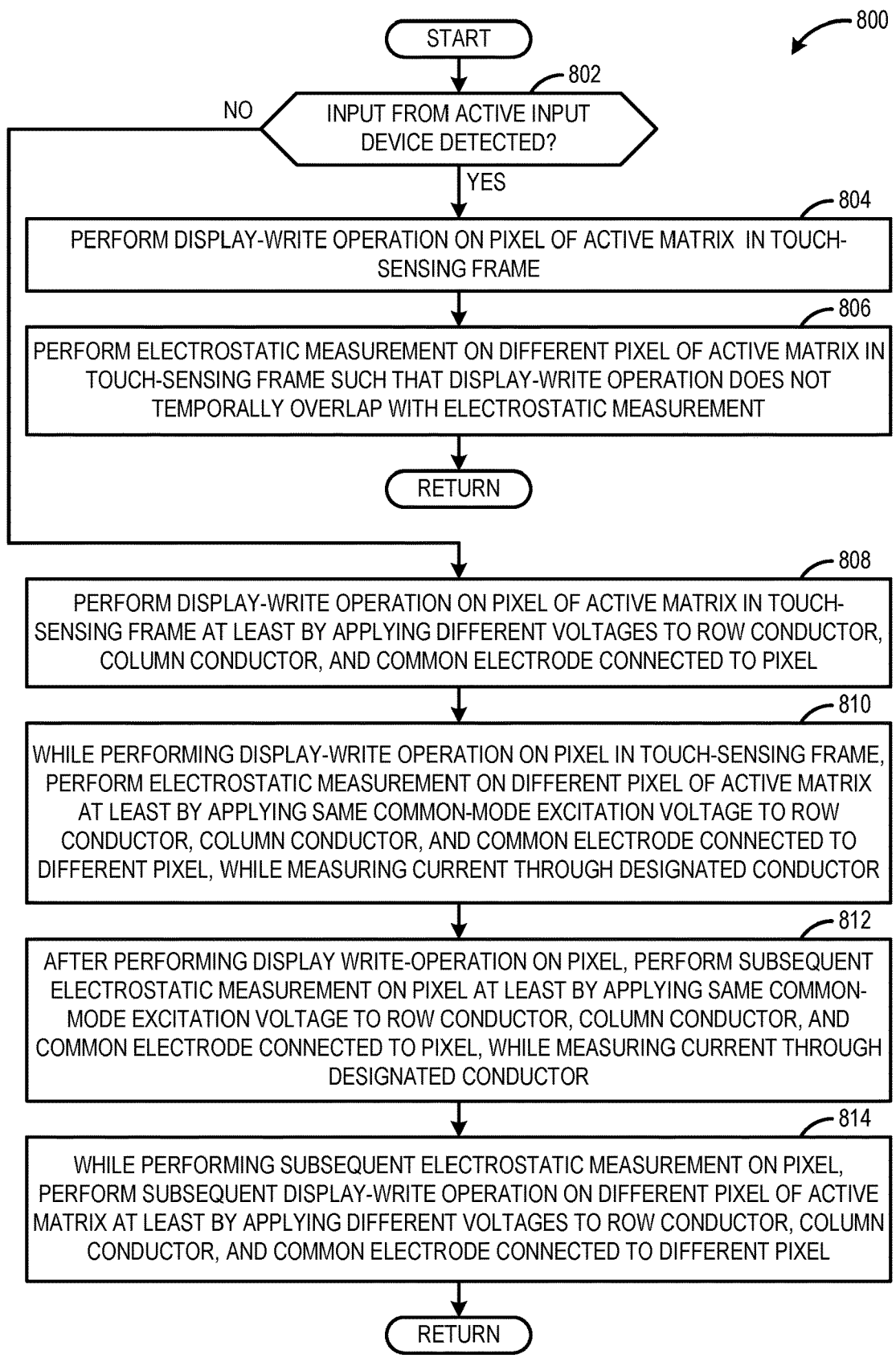
FIG. 8 shows an example for controlling a touch-sensitive in-cell display device.

FIG. 8 shows an example method 800 for controlling a touch-sensitive in-cell display device to perform display-write operations and electrostatic measurements on an active matrix of the device simultaneously. For example, method 800 may be performed by touch-sensitive in-cell display device 100 of FIGS. 1 and 2. At 802, method 800 includes determining whether input from an active input device is detected. An active input device may include a device that includes an electrode that is driven with an excitation signal that is detected by the touch-sensitive in-cell display device. In one example, an active input device is an active stylus.

If input from an active input device is detected, method 800 moves to 804. Otherwise, method 800 moves to 808. At 804, method 800 includes performing a display-write operation on a pixel of an active matrix in a touch-sensing frame. At 806, method 800 includes performing an electrostatic measurement on a different pixel to detect input from the active input device in the touch-sensing frame such that the display-write operation does not temporally overlap with the electrostatic measurement. In this mode of operation, the touch-sensing frame is time divided between performing display-write operations and electrostatic measurements to allow for accurate detection of the active input device.

At 808, method 800 includes performing a display-write operation on a pixel of the active matrix in a touch-sensing frame at least by applying different voltage to a row conductor, a column conductor, and a common electrode connected to the pixel. The different voltages may generate a voltage differential across the pixel that causes the pixel to turn-on/adjust state. At 810, method 800 includes, while performing the display-write operation on the pixel in the touch-sensing frame, performing an electrostatic measurement on a different pixel of the active matrix at least by applying a same common-mode excitation voltage to a row conductor, a column conductor, and a common electrode connected to the different pixel, while measuring a current through a designated conductor. For example, the designated conductor may be a segment of the common electrode connected to the different pixel. At 812, method 800 includes, after performing the display-write operation on the pixel, performing a subsequent electrostatic measurement on the pixel at least by applying the same common-mode excitation voltage to the row conductor, the column conductor, and the common electrode connected to the pixel, while measuring a current through a designated conductor. At 814, method 800 includes, while performing the subsequent electrostatic measurement on the pixel, performing a subsequent display-write operation on a different pixel of the active matrix at least by applying different voltages to the row conductor, the column conductor, and the common electrode connected to the different pixel. In this mode of operation, display-write operations and electrostatic measurements are performed simultaneously in the touch-sensing frame to increase the touch-sensing rate.

Figure 9:
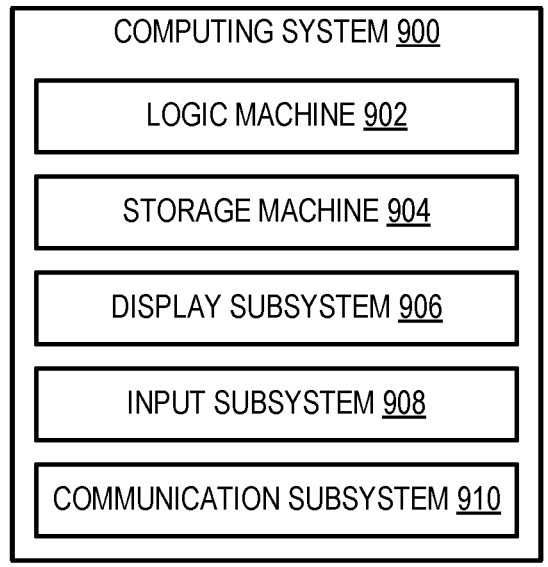
FIG. 9 shows an example computing system.

In some implementations, the methods and processes described herein may be tied to a computing system of one or more computing devices. FIG. 9 schematically shows a non-limiting example of a computing system 900 that can enact one or more of the methods and processes described above. Computing system 900 is shown in simplified form. Computing system 900 may take the form of one or more large-format display computers, small-format display computers, personal computers, tablet computers, home-entertainment computers, network computing devices, gaming devices, mobile computing devices, mobile communication devices (e.g., smart phone), and/or other computing devices. For example, computing system 900 may represent touch-sensitive display device 100 or any other suitable touch-sensitive device.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 902 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices. Display subsystem 906 may include a display that is configured as an in-cell touch-sensitive display including a plurality of sensels that are configured to perform both display output and input sensing functionality.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem 910 may be configured for communication via a wireless telephone network, or a wired or wireless local- or wide-area network. In some implementations, the communication subsystem 910 may allow computing system 900 to send and/or receive messages to and/or from other devices via a network such as the Internet.

In an example, a touch-sensitive in-cell display device comprises an active matrix of row conductors and column conductors, a plurality of pixels, each pixel connected to a row conductor and a column conductor at a different intersection of the active matrix and each pixel connected to a common electrode, and a controller configured to perform a display-write operation on a pixel at a first time at least by applying different voltages to the row conductor, the column conductor, and the common electrode connected to the first pixel, and perform an electrostatic measurement on the pixel at a second time at least by applying a same common-mode excitation voltage to the row conductor, the column conductor, and the common electrode connected to the pixel, while measuring a current through a designated conductor. In this example and/or other examples, the controller may be configured to, while performing the display-write operation on the pixel at the first time, perform an electrostatic measurement on a different pixel at least by applying the same common-mode excitation voltage to a row conductor, a column conductor, and the common electrode connected to the different pixel, while measuring a current through a designated conductor. In this example and/or other examples, the controller may be configured to, while performing the electrostatic measurement on the pixel at the second time, perform a display-write operation on the different pixel at least by applying different voltages to the row conductor, the column conductor, and the common electrode connected to the different pixel. In this example and/or other examples, the pixel and the different pixel may be spaced apart from each other by one or more rows of the active matrix. In this example and/or other examples, the controller may be configured to model an effect that a display-write operation has on the common electrode, and compensate for the modeled effect in the electrostatic measurement that is performed at the same time as the display-write operation. In this example and/or other examples, the display-write operation may be one of a plurality of display-write operations performed by the controller on different pixels of the active matrix in a touch-sensing frame, and the electrostatic measurement may be one of a plurality of electrostatic measurements performed by the controller on different pixels of the active matrix in the touch-sensing frame. In this example and/or other examples, the plurality of display-write operations and the plurality of electrostatic measurements may be performed simultaneously in the touch-sensing frame. In this example and/or other examples, the controller may be configured to, for the touch-sensing frame, perform a first subset of the plurality of display-write operations at least by applying, to a first subset of pixels, positive polarity voltages, and perform a second subset of the plurality of display-write operations at least by applying, to a second subset of pixels, negative polarity voltages. In this example and/or other examples, the controller may be configured to spatially alternate, from row to row of pixels in a same column of the active matrix, between applying positive polarity voltages and applying negative polarity voltages. In this example and/or other examples, the controller may be configured to temporally alternate, from frame to frame, for one or more of the plurality of pixels, between applying positive polarity voltages and applying negative polarity voltages. In this example and/or other examples, the controller may be configured to, if input from an active input device is detected, perform display-write operations and electrostatic measurements such that the display-write operations do not temporally overlap with the electrostatic measurements; and if input from an active input device is not detected, perform display-write operations and electrostatic measurements such that the display-write operations temporally overlap with the electrostatic measurements.

In an example, a method for controlling a touch-sensitive in-cell display device including an active matrix of row conductors and column conductors and a plurality of pixels, each pixel connected to a row conductor and a column conductor at a different intersection of the active matrix, and each pixel connected to a common electrode, comprises performing a display-write operation on a pixel at a first time at least by applying different voltages to the row conductor, the column conductor, and the common electrode connected to the first pixel, and performing an electrostatic measurement on the pixel at a second time at least by applying a same common-mode excitation voltage to the row conductor, the column conductor, and the common electrode connected to the pixel, while measuring a current through a designated conductor. In this example and/or other examples, the method may further comprise, while performing the display-write operation on the pixel at the first time, performing an electrostatic measurement on a different pixel at least by applying the same common-mode excitation voltage to a row conductor, a column conductor, and the common electrode connected to the different pixel, while measuring a current through a designated conductor. In this example and/or other examples, the method may further comprise, while performing the electrostatic measurement on the pixel at the second time, performing a display-write operation on the different pixel at least by applying different voltages to the row conductor, the column conductor, and the common electrode connected to the different pixel. In this example and/or other examples, the method may further comprise modeling an effect that a display-write operation has on the common electrode, and compensating for the modeled effect in the electrostatic measurement that is performed at the same time as the display-write operation. In this example and/or other examples, the display-write operation may be one of a plurality of display-write operations performed on different pixels of the active matrix in a touch-sensing frame, and the electrostatic measurement may be one of a plurality of electrostatic measurements performed on different pixels of the active matrix in the touch-sensing frame. In this example and/or other examples, the method may further comprise, for the touch-sensing frame, performing a first subset of the plurality of display-write operations at least by applying, to a first subset of pixels, positive polarity voltages, and performing a second subset of the plurality of display-write operations at least by applying, to a second subset of pixels, negative polarity voltages. In this example and/or other examples, the method may further comprise, if input from an active input device is detected, performing display-write operations and electrostatic measurements such that the display-write operations do not temporally overlap with the electrostatic measurements, and if input from an active input device is not detected, performing display-write operations and electrostatic measurements such that the display-write operations temporally overlap with the electrostatic measurements.

In an example, a touch-sensitive in-cell display device may comprise an active matrix of row conductors and column conductors, a plurality of pixels, each pixel connected to a row conductor and a column conductor at a different intersection of the active matrix and each pixel connected to a common electrode, and a controller configured to, if input from an active input device is detected, perform a display-write operation on a pixel of the active matrix in a touch-sensing frame, and perform an electrostatic measurement on a different pixel of the active matrix in the touch-sensing frame such that the electrostatic measurement does not temporally overlap with the display-write operation, and if input from an active input device is not detected, perform a display-write operation on a pixel of the active matrix in the touch-sensing frame at least by applying different voltages to the row conductor, the column conductor, and the common electrode connected to the pixel, and while performing the display-write operation on the pixel in the touch-sensing frame, perform an electrostatic measurement on a different pixel of the active matrix at least by applying the same common-mode excitation voltage to a row conductor, a column conductor, and the common electrode connected to the different pixel, while measuring a current through a designated conductor. In this example and/or other examples, the controller may be configured to, if input from an active input device is not detected, after performing the display write-operation on the pixel, perform a subsequent electrostatic measurement on the pixel at least by applying the same common-mode excitation voltage to a row conductor, a column conductor, and the common electrode connected to the pixel, while measuring a current through a designated conductor, and while performing the subsequent electrostatic measurement on the pixel, perform a subsequent display-write operation on a different pixel of the active matrix at least by applying different voltages to the row conductor, the column conductor, and the common electrode connected to the different pixel.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-sensitive in-cell display device, comprising:
an active matrix of row conductors and column conductors;
a plurality of pixels including a first pixel, each pixel connected to a row conductor and a column conductor at a different intersection of the active matrix and each pixel connected to a common electrode; and
a controller configured to:
perform a display-write operation on the first pixel at a first time at least by applying different voltages to the row conductor, the column conductor, and the common electrode connected to the first pixel; and
perform an electrostatic measurement on the first pixel at a second time at least by applying a same excitation voltage to the row conductor, the column conductor, and the common electrode connected to the first pixel, while measuring a current through a designated conductor
if input from an active input device is detected, perform display-write operations and electrostatic measurements such that the display-write operations do not temporally overlap with the electrostatic measurements; and
if input from an active input device is not detected, perform display-write operations and electrostatic measurements such that the display-write operations temporally overlap with the electrostatic measurements.

2. The touch-sensitive in-cell display device of claim 1, wherein the controller is configured to:
while performing the display-write operation on the first pixel at the first time, perform an electrostatic measurement on a second pixel of the plurality of pixels at least by applying the same excitation voltage to a row conductor, a column conductor, and the common electrode connected to the second pixel, while measuring a current through a designated conductor.

3. The touch-sensitive in-cell display device of claim 2, wherein the controller is configured to:
while performing the electrostatic measurement on the first pixel at the second time, perform a display-write operation on the second pixel at least by applying different voltages to the row conductor, the column conductor, and the common electrode connected to the second pixel.

4. The touch-sensitive in-cell display device of claim 2, wherein the first pixel and the second pixel are spaced apart from each other by one or more rows of the active matrix.

5. The touch-sensitive in-cell display device of claim 2, wherein the controller is configured to model an effect that a display-write operation has on the common electrode, and compensate for the modeled effect in the electrostatic measurement that is performed at the same time as the display-write operation.

6. The touch-sensitive in-cell display device of claim 1, wherein the display-write operation is one of a plurality of display-write operations performed by the controller on different pixels of the active matrix in a touch-sensing frame, and wherein the electrostatic measurement is one of a plurality of electrostatic measurements performed by the controller on different pixels of the active matrix in the touch-sensing frame.

7. The touch-sensitive in-cell display device of claim 6, wherein the plurality of display-write operations and the plurality of electrostatic measurements are performed simultaneously in the touch-sensing frame.

8. The touch-sensitive in-cell display device of claim 6, wherein the controller is configured to, for the touch-sensing frame, perform a first subset of the plurality of display-write operations at least by applying, to a first subset of pixels, positive polarity voltages, and perform a second subset of the plurality of display-write operations at least by applying, to a second subset of pixels, negative polarity voltages.

9. The touch-sensitive in-cell display device of claim 8, wherein the controller is configured to spatially alternate, from row to row of pixels in a same column of the active matrix, between applying positive polarity voltages and applying negative polarity voltages.

10. The touch-sensitive in-cell display device of claim 9, wherein the controller is configured to temporally alternate, from frame to frame, for one or more of the plurality of pixels, between applying positive polarity voltages and applying negative polarity voltages.

11. A method for controlling a touch-sensitive in-cell display device including an active matrix of row conductors and column conductors and a plurality of pixels including a first pixel, each pixel connected to a row conductor and a column conductor at a different intersection of the active matrix, and each pixel connected to a common electrode, the method comprising:
performing a display-write operation on the first pixel at a first time at least by applying different voltages to the row conductor, the column conductor, and the common electrode connected to the first pixel; and performing an electrostatic measurement on the first pixel at a second time at least by applying a same excitation voltage to the row conductor, the column conductor, and the common electrode connected to the first pixel, while measuring a current through a designated conductor;

if input from an active input device is detected, performing display-write operations and electrostatic measurements such that the display-write operations do not temporally overlap with the electrostatic measurements; and if input from an active input device is not detected, performing display-write operations and electrostatic measurements such that the display-write operations temporally overlap with the electrostatic measurements.

12. The method of claim 11, further comprising:
while performing the display-write operation on the first pixel at the first time, performing an electrostatic measurement on a second pixel of the plurality of pixels at least by applying the same excitation voltage to a row conductor, a column conductor, and the common electrode connected to the second pixel, while measuring a current through a designated conductor.

13. The method of claim 12, further comprising:
while performing the electrostatic measurement on the first pixel at the second time, performing a display-write operation on the second pixel at least by applying different voltages to the row conductor, the column conductor, and the common electrode connected to the second pixel.

14. The method of claim 12, further comprising:
modeling an effect that a display-write operation has on the common electrode; and
compensating for the modeled effect in the electrostatic measurement that is performed at the same time as the display-write operation.

15. The method of claim 11, wherein the display-write operation is one of a plurality of display-write operations performed on different pixels of the active matrix in a touch-sensing frame, and wherein the electrostatic measurement is one of a plurality of electrostatic measurements performed on different pixels of the active matrix in the touch-sensing frame.

16. The method of claim 15, further comprising:
for the touch-sensing frame, performing a first subset of the plurality of display-write operations at least by applying, to a first subset of pixels, positive polarity voltages, and performing a second subset of the plurality of display-write operations at least by applying, to a second subset of pixels, negative polarity voltages.

17. A touch-sensitive in-cell display device, comprising:
an active matrix of row conductors and column conductors;
a plurality of pixels including a first pixel, each pixel connected to a row conductor and a column conductor at a different intersection of the active matrix and each pixel connected to a common electrode; and
a controller configured to:
perform a display-write operation on the first pixel at a first time at least by applying different voltages to the row conductor, the column conductor, and the common electrode connected to the first pixel, wherein the first time begins when the different voltages are applied to all of the row conductor, the column conductor, and the common electrode connected to the first pixel, and wherein the first time ends when application of the different voltages ceases for any of the row conductor, the column conductor, and the common electrode connected to the first pixel;
while performing the display-write operation on the first pixel at the first time, perform an electrostatic measurement on a second pixel of the plurality of pixels at least by applying a same excitation voltage to a row conductor, a column conductor, and the common electrode connected to the second pixel, while measuring a current through a designated conductor; and
perform an electrostatic measurement on the first pixel at a second time at least by applying the same excitation voltage to the row conductor, the column conductor, and the common electrode connected to the first pixel, while measuring a current through a designated conductor.

18. The touch-sensitive in-cell display device of claim 17, wherein the controller is configured to:
if input from an active input device is detected, perform display-write operations and electrostatic measurements such that the display-write operations do not temporally overlap with the electrostatic measurements; and
if input from an active input device is not detected, perform display-write operations and electrostatic measurements such that the display-write operations temporally overlap with the electrostatic measurements.

* * * * *